United States Patent
Atsumi et al.

(10) Patent No.: US 7,817,850 B2
(45) Date of Patent: Oct. 19, 2010

(54) INFORMATION TERMINAL

(75) Inventors: Eiji Atsumi, Kanagawa (JP); Kazunobu Shin, Frisco, TX (US)

(73) Assignee: Nokia Corporation, Espoo (FI)

( * ) Notice: Subject to any disclaimer, the term of this patent is extended or adjusted under 35 U.S.C. 154(b) by 766 days.

(21) Appl. No.: 10/519,857

(22) PCT Filed: Jun. 27, 2003

(86) PCT No.: PCT/JP03/08175

§ 371 (c)(1),
(2), (4) Date: Aug. 15, 2005

(87) PCT Pub. No.: WO2004/004361

PCT Pub. Date: Jan. 8, 2004

(65) Prior Publication Data

US 2006/0101080 A1    May 11, 2006

(30) Foreign Application Priority Data

Jun. 28, 2002    (JP)    ............... 2002-191375

(51) Int. Cl.
G06K 9/00    (2006.01)
G06K 9/48    (2006.01)
G06K 9/40    (2006.01)

(52) U.S. Cl. .................. 382/167; 382/266; 382/162; 382/199; 348/222.1

(58) Field of Classification Search ......... 382/162–167, 382/195, 199, 260–266; 345/589; 348/222.1
See application file for complete search history.

(56) References Cited

U.S. PATENT DOCUMENTS 5,053,861 A * 10/1991 Tsai et al. ............ 348/231.6
5,384,648 A * 1/1995 Seidner et al. ............ 358/534
5,663,772 A * 9/1997 Uehara et al. ............ 348/671
5,668,890 A * 9/1997 Winkelman ............ 382/167
5,778,106 A * 7/1998 Juenger et al. ............ 382/275
5,861,917 A * 1/1999 Tariki et al. ............ 348/230.1
6,134,345 A * 10/2000 Berman et al. ............ 382/162
6,144,412 A * 11/2000 Hirano et al. ............ 348/441
6,259,811 B1 * 7/2001 Tsuji ............ 382/166

(Continued)

FOREIGN PATENT DOCUMENTS

JP    2-92181 A    3/1990

(Continued)

OTHER PUBLICATIONS

Adams et al. "Color Processing in Digital Cameras" IEEE (1998, pp. 1-11).*

Primary Examiner—Bhavesh M Mehta
Assistant Examiner—Mia M Thomas
(74) Attorney, Agent, or Firm—Harrington & Smith

(57) ABSTRACT

An information terminal that can perform image processing in consonance with the use state and the use purpose. When a retrial module is started, removal means removes part or all of the interpolation processing performed for a Bayer-type module. Thereafter, data obtained by the removal are transmitted to color interpolation means, another color interpolation process is performed for the data, and the resultant data are transmitted to image quality correction means. The image quality correction means performs another image quality correction process for the data, and transmits the obtained data to JPEG encoding means.

7 Claims, 12 Drawing Sheets

U.S. PATENT DOCUMENTS

| | | | |
|---|---|---|---|
| 6,601,056 B1 * | 7/2003 | Kagle et al. | 707/1 |
| 6,616,281 B1 * | 9/2003 | Vlahos et al. | 353/28 |
| 6,640,005 B1 * | 10/2003 | Westerman et al. | 382/166 |
| 6,650,795 B1 * | 11/2003 | Motta | 382/312 |
| 6,731,397 B1 * | 5/2004 | Merrill et al. | 358/1.16 |
| 6,731,800 B1 * | 5/2004 | Barthel et al. | 382/176 |
| 6,766,052 B2 * | 7/2004 | Okada et al. | 382/162 |
| 6,801,251 B1 * | 10/2004 | Kawaoka et al. | 348/231.3 |
| 6,823,090 B2 * | 11/2004 | Matsuura | 382/275 |
| 6,934,050 B2 * | 8/2005 | Merrill et al. | 358/1.16 |
| 6,954,228 B1 * | 10/2005 | Acharya et al. | 348/223.1 |
| 6,977,683 B1 * | 12/2005 | Okada | 348/273 |
| 6,982,756 B2 * | 1/2006 | Nakamura | 348/241 |
| 6,999,197 B1 * | 2/2006 | Nabeshima | 358/1.9 |
| 7,016,549 B1 * | 3/2006 | Utagawa | 382/261 |
| 7,064,862 B2 * | 6/2006 | Takashimizu | 358/1.9 |
| 7,079,705 B2 * | 7/2006 | Zhang et al. | 382/280 |
| 7,099,506 B2 * | 8/2006 | Mishima | 382/166 |
| 7,116,441 B1 * | 10/2006 | Matsuoka | 358/1.9 |
| 7,116,819 B2 * | 10/2006 | Zhang | 382/162 |
| 7,286,701 B2 * | 10/2007 | Muraki | 382/167 |
| 7,330,189 B2 * | 2/2008 | Nichogi et al. | 345/589 |
| 2001/0055414 A1 * | 12/2001 | Thieme | 382/135 |
| 2002/0008760 A1 * | 1/2002 | Nakamura | 348/222 |
| 2002/0021832 A1 * | 2/2002 | Dawson | 382/154 |
| 2002/0191104 A1 * | 12/2002 | Matsutani et al. | 348/441 |
| 2003/0031375 A1 * | 2/2003 | Enomoto | 382/255 |
| 2003/0219156 A1 * | 11/2003 | Muraki | 382/167 |
| 2003/0231251 A1 * | 12/2003 | Tsukioka | 348/272 |
| 2004/0101195 A1 * | 5/2004 | Akaishi | 382/162 |
| 2005/0068421 A1 * | 3/2005 | Dutta et al. | 348/207.99 |
| 2005/0238225 A1 * | 10/2005 | Jo et al. | 382/162 |
| 2005/0286779 A1 * | 12/2005 | Sasaki et al. | 382/232 |
| 2006/0291746 A1 * | 12/2006 | Kang et al. | 382/275 |
| 2007/0069934 A1 * | 3/2007 | Mills et al. | 341/144 |
| 2007/0268408 A1 * | 11/2007 | Kim et al. | 348/607 |
| 2010/0097499 A1 * | 4/2010 | Taoka | 348/240.99 |

FOREIGN PATENT DOCUMENTS

| | | |
|---|---|---|
| JP | 4-85990 | 7/1992 |
| JP | 11-113018 A | 4/1999 |
| JP | 11-168745 | 6/1999 |
| JP | 11-168745 A | 6/1999 |
| WO | WO 00/72604 A1 | 11/2000 |
| WO | WO 01/84851 A1 | 11/2001 |
| WO | WO 02/19724 A1 | 3/2002 |

* cited by examiner

INFORMATION TERMINAL

TECHNICAL FIELD

The present invention relates to an information information terminal, and specifically to an information terminal including an interpolation device.

BACKGROUND ART

Recently, information terminals equipped with cameras have become popular, and have also been employed as means for imaging, browsing and image communication.

For example, in the case of a cellular phone equipped with a camera, an image acquired by the camera is used in various ways, such as being transmitted as a file attached to email text, being used for real-time communication (a television telephone), or being printed by a user. The same uses may be made of an image received from a third party and of an image downloaded from a server.

Therefore, originally, in order to increase the usability, it is preferable that the image quality or the speed required for the processing, i.e., the amount of processing for an operation or the amount of processing memory, be changed in accordance with the use of a photographic image or a received image, as described above.

For example, as shown in FIG. 5, "processing speed has priority over image quality" when a photographic image is to be used for real-time communication. On the other hand, for example, when a photographic image is to be printed out, a case wherein "image quality takes priority over processing speed" is more meritorious for a user.

DISCLOSURE OF THE INVENTION

However, generally, a conventional cellular phone merely provides a fixed image quality and a fixed processing speed, regardless of what is favored by a user and its use.

Furthermore, since downsizing and a reduction in power consumption and its costs are indispensable for an information terminal, such as a cellular phone, it is not easy to mount a camera, such as described above, that performs flexible image processing.

Further, since downsizing, a reduction in power consumption and costs are also indispensable for the processor of an information terminal, it is not generally projected that all of the image processing ordinarily performed by a camera be shifted to the processor in order to guarantee the flexibility of the camera image processing.

While taking the above points into account, one objective of the present invention is to provide an information terminal that can minimize alterations of a camera and a processor of the information terminal, and that can flexibly change image quality and processing speeds, at a low cost and within a short period of time, in accordance with the usage states and other, varied conditions, such as the extent of operations, required of the imaging processing performed by the camera and the information terminal, and the amount of processing memory required for the operation.

It is another objective of the present invention to provide an information terminal that can reduce the influences due to the simplified processing, performed by a camera DSP, and that can qualitatively increase the value of an image.

It is an additional objective of the present invention to provide an information terminal having a function that, in accordance, for example, with a use state, flexibly increases image quality one level and exceeds that of an information terminal equipped with a camera having the same function.

It is a further objective of the present invention to provide an information terminal that can improve the image quality, either without requiring a change in the hardware architecture of a camera module mounted on the information terminal or without increasing the size of a camera DSP.

To achieve these objectives, according to a first invention of the present invention, an information terminal is characterized by comprising:

data operation processing means, for performing operation processing for input image data and preparing output image data;

removal means, for removing, from the output image data, part or all of the steps of an operational processing sequence performed for the input image data; and data processing means, for performing other operational processing steps for data obtained by the removal means and for preparing output image data.

The image data input to the information terminal are, specifically, color image data based on a Bayer-type RGB arrangement, i.e., an arrangement of red, blue and green pixels that generally is used by a single-chip image sensor of a color camera.

The data processing means for the information terminal is specific means for performing interpolation processing, and more specifically, is means, when a sensor outputs R, G or B pixels, for employing the values of adjacent pixels having the same color to perform interpolation processing using the nearest neighbor method, the linear approximation method or the cubic convolution method for pixels G and B, R and B, or R and G that have been eliminated by a color filter that is laid on the surface of the sensor.

It is preferable, when irreversible processing has been is performed for the image data input to the information terminal and the output image data have been prepared, that the removal means perform inverse function transformation processing to remove part or all of the interpolation processing performed for the input data.

It is preferable that the data processing means of the information terminal again perform an edge enhancement process.

Furthermore, according to a second invention of the present invention, an information terminal is characterized by comprising:

a camera module, which has an image sensor for digitizing and using a signal output by the image sensor to prepare first Bayer-type data, and for employing the first Bayer-type data to prepare first image data, using a first algorithm, and transmitting the first image data; and a host module, having a main storage device, for receiving the first image data obtained by the camera module and storing the received first image data in the main storage device, for reading the first image data from the main storage device and extracting second Bayer-type data from the first image data that have been read, and for employing the second Bayer-type data to prepare second image data using a second algorithm.

It is preferable that the first image data and/or the second image data have an RGB form or a YUV form.

It is preferable that the first image data provided be compressed.

It is preferable that the host module include a data output unit for outputting data to a printer, so that the second image data are output to the printer through the data output unit.

BEST MODES FOR CARRYING OUT THE INVENTION

1. First Mode

A first mode of the present invention will now be described while referring to the accompanying drawings.

(1) Explanation for Encoding Photographed Images

Figure 1:
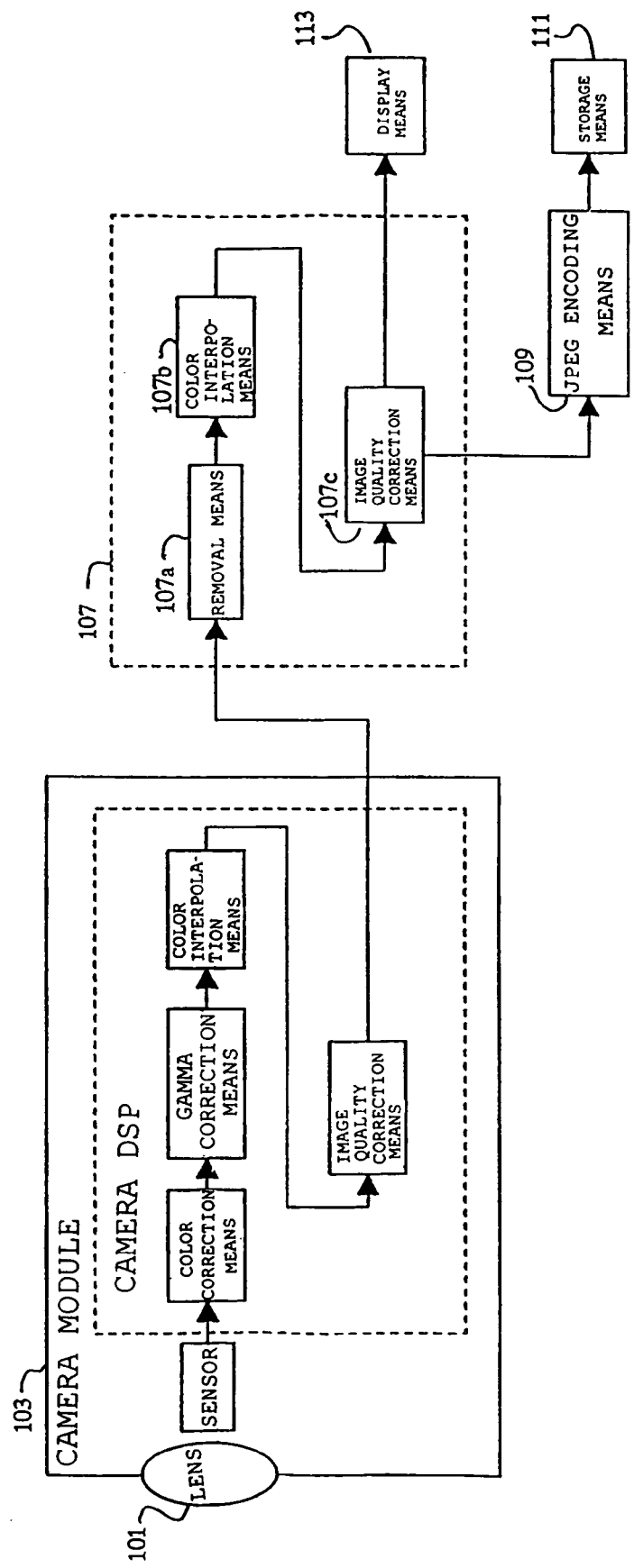
FIG. 1 is a functional block diagram showing the periphery of a retrial module according to one mode of the present invention.

FIG. 1 is a functional block diagram for explaining this mode of the invention, and for showing only modules of an information terminal that are required to explain the present invention. In this mode, a photographed image is encoded into a predetermined form (a JPEG form in FIG. 1) to be stored or to be transmitted, for example.

A camera module 103 includes a sensor and a camera DSP. The sensor has, for example, a color filter to cope with the three primary colors of light, blue (B), green (G) and red (R), and in this filter, G is arranged in checkerboardwise and R and B are sequentially arranged linearly. In this specification, this arrangement is called a Bayer-type arrangement. Image data that are output by the camera module that employs the color filter having the Bayer-type arrangement also have a Bayer-type arrangement.

When a user points a lens 101 at a subject and releases the shutter, the sensor generates image data that include a Bayer-type arrangement consonant with the detected subject, and the camera DSP performs operations that are image quality correction means that includes gamma correction means, color interpolation means and an edge enhancement process and other processes.

During these operations, the individual color elements of the image data having the Bayer-type arrangement, i.e., the R element, the G element and the B element, are extracted; the color correction means adjusts the balance of the color elements; the gamma correction means transforms the values of the pixels for the individual color elements independently, by using transformation expressions or a lookup table; and the color interpolation means performs interpolation processing, so that missing color elements, for the pixel positions of the individual color elements, are provided, for adjacent pixels having the same color elements. As a result, the color elements that are removed by the color filter laid on the image sensor are restored for all the pixels.

In this case, since minimization of the chip area and reductions in size and cost are requested, problems could occur in the operating ability of the camera DSP; for example, a complicated operation may be disabled that requires many operations or a large capacity processing memory, such as a line memory, to perform image processing, an extended period of time may be required even when such a complicated operation is enabled, or synchronization with a succeeding processing step of receiving processing results may not be obtained.

Therefore, the color correction means, the gamma correction means and the color interpolation means available at this stage are those for which the operational processing and the processing memory size are reduced as much as possible. In particular, for the color interpolation means, which is one of the image processing means that most requires memory and operational processing resources, an example can be provided that, relative to adjacent pixels, for example, employs a linear interpolation method.

Similarly, for the edge enhancement processing that, comparatively, consumes as many processing resources, there are many examples wherein, in order to optimize the amount of processing memory and the amount of operational processing, edge enhancement filters having horizontally elongated and vertically shortened taps are employed that can perform the processing but that use a smaller number of line memories.

Several other image quality correction processes are performed for the image data obtained by the above described various processing means, and after the processing sequence for the camera is completed and when the storage of image data is the purpose, compression processing, such as JPEG compression, is performed for the image data, and the compressed image data (hereinafter referred to as processed data) are output to storage means 111. When the display of image data is the purpose, image quality correction processing is performed for the image data to obtain the optimally limited number of pixels and number of colors for display means 113, and the thus obtained image data are output to the display means 113.

A retrial module 107 includes removal means 107a, color interpolation means 107b and image quality correction means 107c, and data output by the camera module, i.e., processed data, are transmitted to the removal means 107a.

When the retrial module 107 is started, the removal means 107a removes part or all of the image processing that has been performed for the processed data by the camera DSP. The processes removed here are, for example, the color interpolation process, performed for image data having a Bayer-type arrangement, and/or the edge enhancement process, which is a typical step performed as part of another image quality improvement process.

When the interpolation process has been removed from the interpolated data, data having a Bayer-type arrangement are recreated. In this case, the removal of the interpolation process consists of the performance of an intermittent process by which the R, G and B elements of a color image, obtained by the series of camera processing events, are arranged in consonance with the R, G and B Bayer-type arrangement for the image sensor.

When the color elements of the individual pixels obtained through the performance of the color interpolation process are reset, restrictions imposed on the color interpolation processing and the image quality improvement processing that are provided by the camera DSP are reduced to their lowest levels.

Thereafter, the data obtained in the removal process are transmitted to the image quality correction means 107c, the retrial module 107 performs an interpolation process that differs from that performed by the camera DSP and, if needed, an edge enhancement process that differs from that included in the image quality improvement processing for the camera DSP, and the resultant data are transmitted to JPEG encoding means 109.

An interpolation process that requires a more complicated operation, an increased amount of operational processing and a greater amount of processing line memory can be employed as another interpolation method. Similarly, a process that requires a more complicated operation, an increased amount of operational processing and a greater amount of processing memory can be employed as an edge enhancement process that is included in other image quality improvement processing.

According to this mode, for example, an interpolation process that uses the nearest neighbor method is provided by the camera DSP, and is performed by employing an amount of processing memory that is the equivalent of two lines of image data, without any multiplication being required. Then, the retrial module 107 employs an interpolation process, using a cubic convolution method, to perform floating-point multiplication for a quantity of processing memory that is the equivalent of five lines of image data.

Furthermore, the interpolation process performed by the camera DSP includes the image quality improvement process that uses an edge enhancement filter wherein taps for five horizontally arranged pixels are provided for each line of an image. The retrial module 107 provides the image quality improving process, using edge enhancement filters, in which taps for five horizontal pixels are provided for each three line group in an image, that are changed in accordance with the set of values in each block of 3×5 pixels.

Of course, the present invention is not limited to these specific color interpolation and edge enhancement processes, and has a general processing architecture.

According to this mode, only when the retrial of the interpolation process is required is the retrial module 107 started, and when the retrial is not required, processed data are transmitted directly from the camera module 103 to the JPEG encoding means 109.

Whether or not the retrial is required is visually determined when an image is photographed and is displayed on the screen provided by the information terminal.

The start of the retrial module 107 is instructed, by the manipulation of a user menu or a key button prepared for the information terminal, when it is visually determined that the image quality is unsatisfactory, such as when an image is slightly blurred or there are jaggies along the edges.

Of course, processing means for automatically determining whether an image quality is satisfactory, and processing means that employ the results obtained by automatic determination to automatically start the retrial module 107 may be provided.

The retrial module 107 may employ processing that differs from the processing provided by the camera DSP, in addition to such image quality improvement processing as the interpolation process and the edge enhancement process, or may employ different processes as only parts of these processes.

Figure 3:
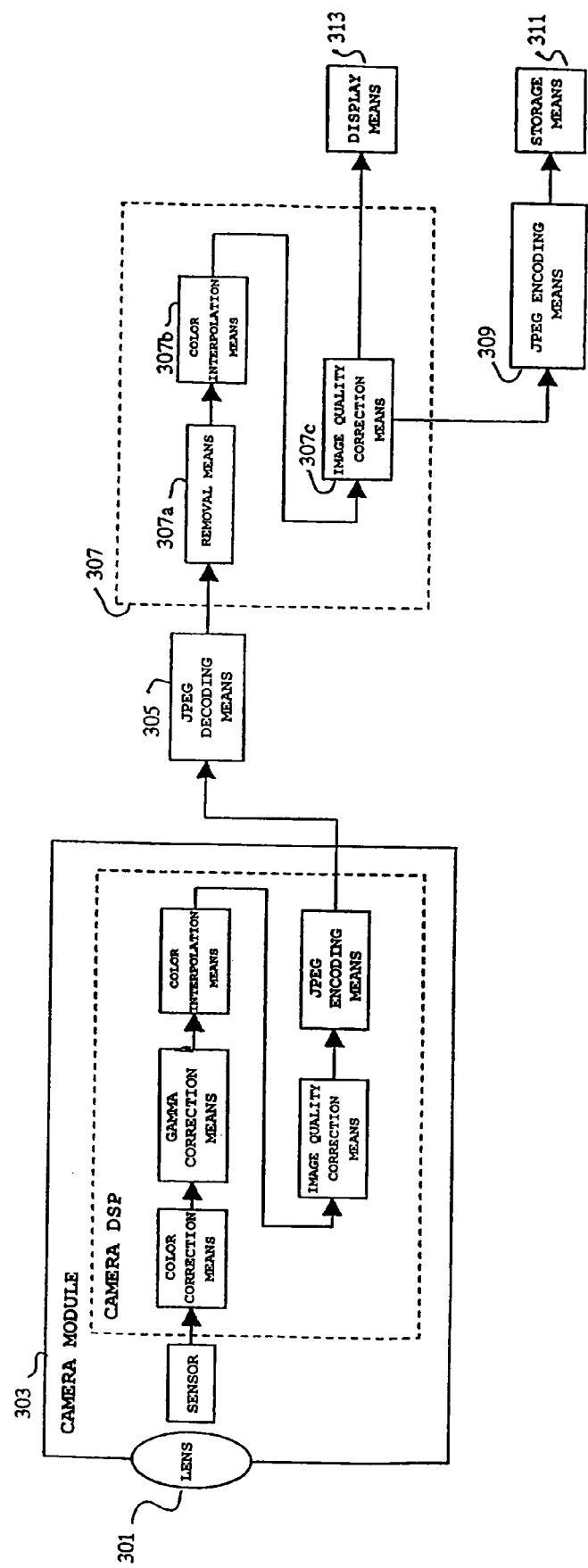
FIG. 3 is a functional block diagram showing the periphery of the retrial module according to the mode of the present invention.

In the mode described above, before the JPEG compression process is performed, immediately after an image is photographed, whether the retrial module 107 should be started is determined and the processing included for the retrial module is performed. However, as is shown in FIG. 3, these process sequences may be performed for an image obtained using JPEG compression.

That is, JPEG decoding means 305 performs the JPEG decoding processing for JPEG compressed image data and displays the resultant data on a screen, and a retrial module 307 is started and the processing results are transmitted as processed data to JPEG encoding means 309.

(2) Explanation for Outputting of Decoded Image

Figure 2:
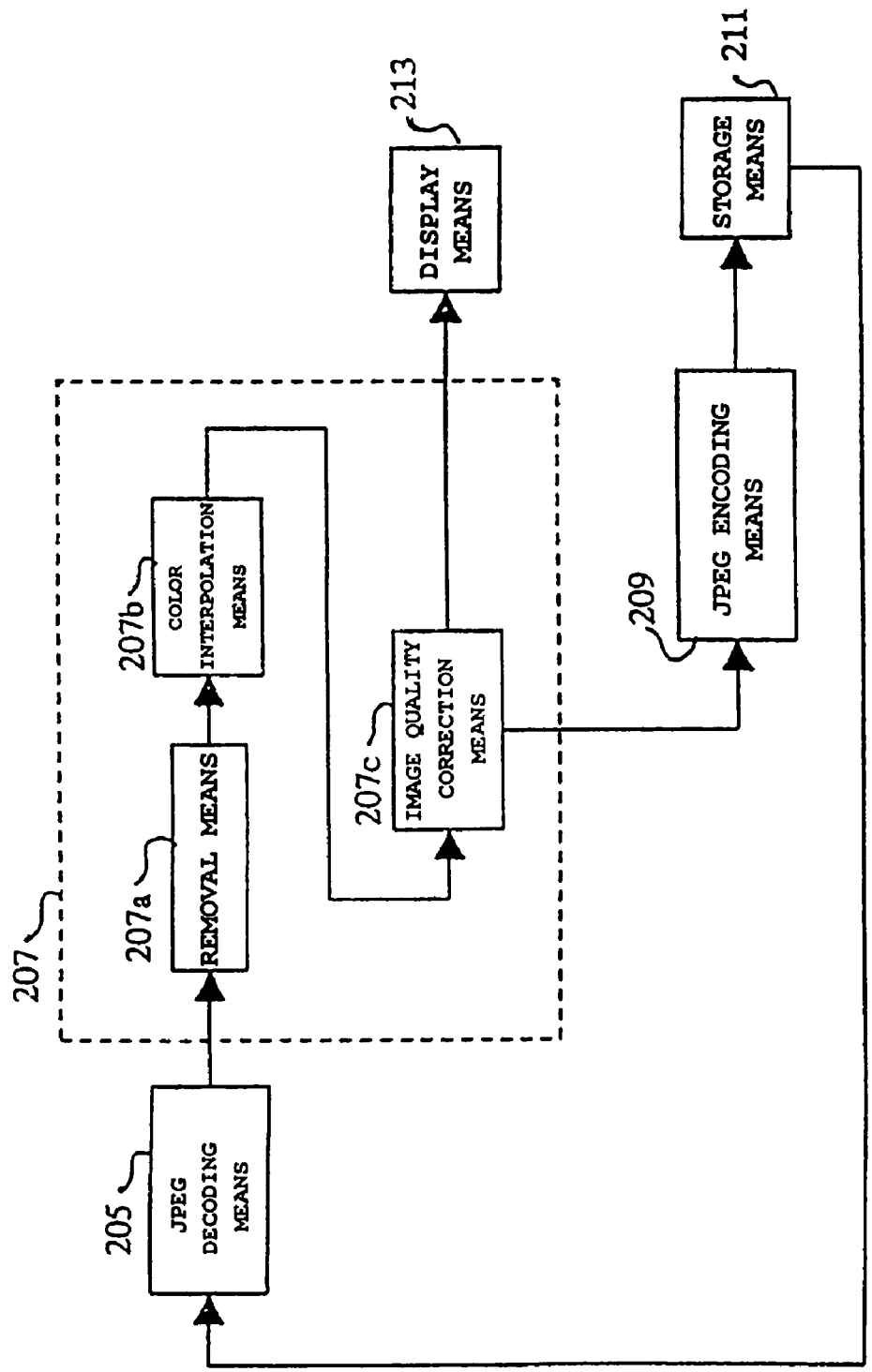
FIG. 2 is a functional block diagram showing the periphery of the retrial module according to the mode of the present invention.

FIG. 2 is a functional block diagram for explaining another mode according to the present invention, and shows only modules that constitute an information terminal according to the present invention and that are required to explain this invention. According to this mode, an image obtained as a predetermined form (a JPEG form in FIG. 2) is output and stored.

An explanation will be given for an example wherein JPEG decoding means 205 decodes a JPEG image, again performs the processing for the obtained image, and outputs the results.

A retrial module 207 includes removal means 207a, color interpolation means 207b and image quality correction means 207c, and the JPEG decoding means 205 transmits JPEG decoded image data to the removal means 207a.

When the retrial module 207 is started, the removal means 207a removes part or all of the image quality improvement processing, including an interpolation process (nearest neighbor interpolation, as a specific example) and an edge enhancement process, that has been performed for the decoded data.

Thereafter, the data obtained in the removal process are transmitted to the color interpolation means 207b, which then performs another interpolation process and another edge enhancement process (fixed edge enhancement process with five taps for one line), and transmits the obtained data to display means 213.

According to this mode, an example wherein the linear approximation method or the cubic convolution method is used can be employed as another interpolation method. Further, an example wherein a flexible edge enhancement filter is used, for local characteristics of an image wherein five taps are provided for three lines, can also be employed.

According to this mode, when a retrial of the interpolation process is required, the retrial module 207 is started, and when a retrial is not required, the JPEG encoding means 205 transmits data, unchanged, to the display means 213. The retrial module 207 may be started when a retrial of the edge enhancement process is required, and may perform the interpolation process and the edge enhancement process and then perform the processing in the above described manner.

(3) Processing Performed by Retrial Module

Figure 4:
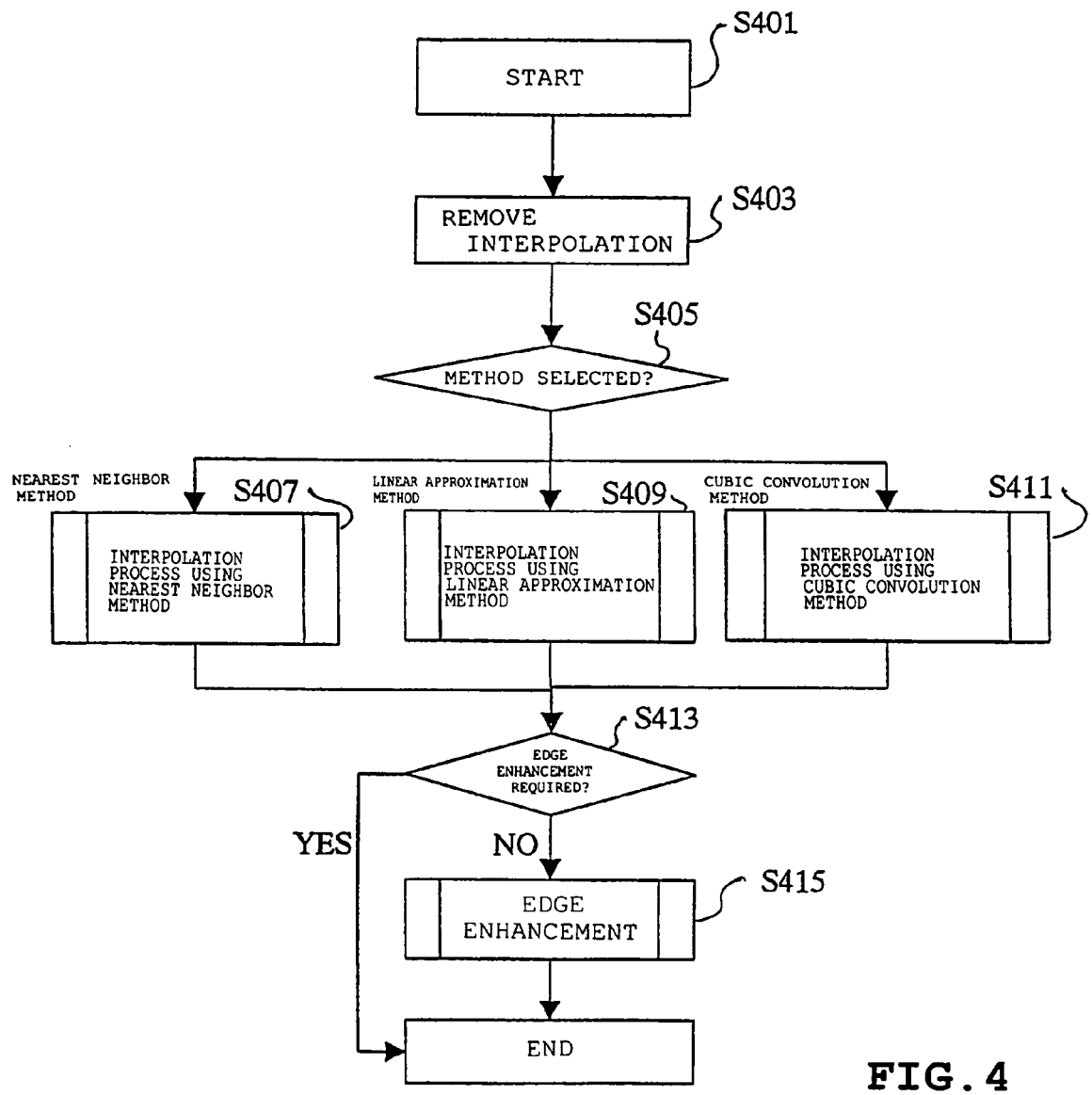
FIG. 4 is a flowchart for the retrial module according to the mode of the present invention.
Figure 5:
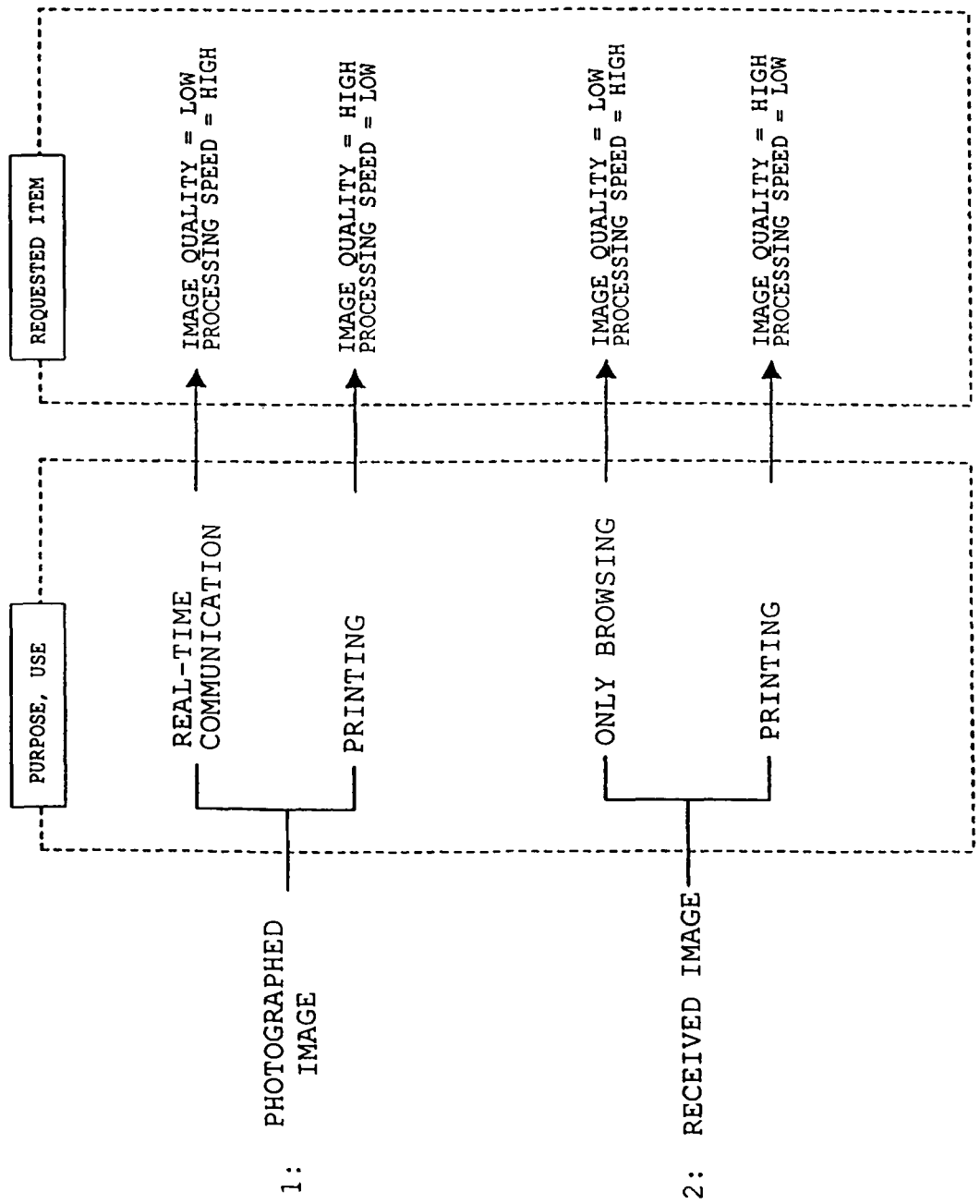
FIG. 5 is a diagram showing a relationship between the purposes of the use of an information terminal and requested items.

FIG. 4 is a flowchart for explaining the processing performed by the retrial module.

When the retrial module is started (S401), first, the module removes part or all of the image quality improvement processing, including the interpolation process and the edge enhancement process, that have been performed for input data (S403).

Generally, the sequence for the performance of these processes consists of a plurality of steps, and whether all the processes performed at all the steps should be removed or only a process performed at a predetermined step should be removed can be determined in accordance with the situation.

The processing performed for the input data includes a substantially reversible process and a substantially irreversible process. Whether a substantially irreversible process (e.g., the color elements of pixels for an image that is obtained by performing the interpolation process for Bayer-arranged data using the nearest neighbor method) is performed depends on whether a substantially reversible process, i.e., for the values of the original individual pixels that were present prior to the interpolation process, was performed for the Bayer-arranged data.

The pixels obtained by interpolation and the pixels used for the interpolation process, i.e., the color elements of the pixels that correspond to the Bayer arrangement, are classified, and information relating to the original Bayer-arranged data can be recreated based on the image data. As a result, the correction process can be easily removed.

Actually, there are several variations of the Bayer arrangement. Therefore, in order to identify which color elements of which pixels were pixels that correspond to the Bayer arrangement, or which pixels were obtained by interpolation, the pattern of the Bayer arrangement for the image sensor of the camera must be stored in the information terminal, and must be referred to when the retrial process is to be performed.

The same function can be provided in such a manner that the camera module outputs the pattern for a Bayer arrangement as a camera processing parameter that is accompanied by image data, and a data parser is provided for the information terminal so as to separate image data from the parameter information and extract the pattern for the Bayer arrangement.

Further, to preferably perform the same processing for image data that are obtained and transmitted by another information terminal, or an image that was previously photographed and has been stored, a file format and an additional information file are prepared for the storage, with the image data, of the pattern for a Bayer arrangement.

It should be noted, however, that the image quality can be improved by presuming a default Bayer arrangement, instead of obtaining a correct Bayer arrangement that was employed, and by preforming the retrial process as described above.

When the correction/removal process (S403) is completed, a newly employed method for a correction process is selected (S405). The method selection may be manually performed by a user, or may be automatically performed by the terminal in accordance with the use state and various conditions.

In a case wherein, for example, an interpolation process, such as a process performed using the nearest neighbor method, that does not require a large amount of operational processing and a great amount of processing memory has been performed for the original image data, a process by which a natural image is obtained, e.g., a process using the linear approximation method or the cubic convolution method, is performed, for example, to improve the image quality. In this manner, the re-interpolation process can be performed (S409 or S411). On the other hand, when the processing speed has a higher priority than has the image quality, the re-interpolation process can be performed by using the nearest neighbor method (S407). Further, when edge enhancement is required, a corresponding process is performed (S415) and the processing is terminated.

(4) Explanation for Interpolation Method Employed in this Mode

Figure 6:
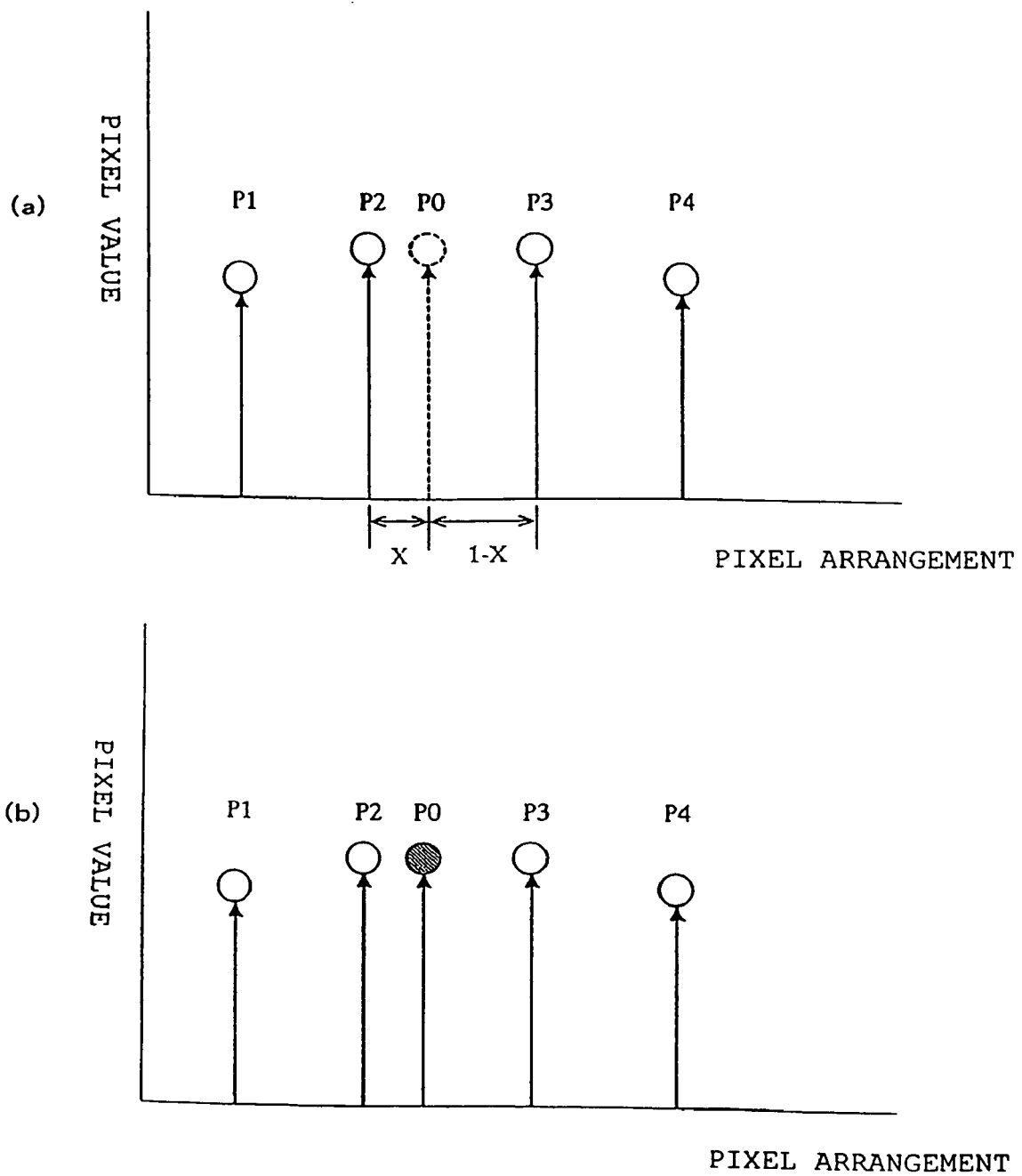
FIG. 6 is a diagram for explaining a first method for the interpolation processing.
Figure 7:
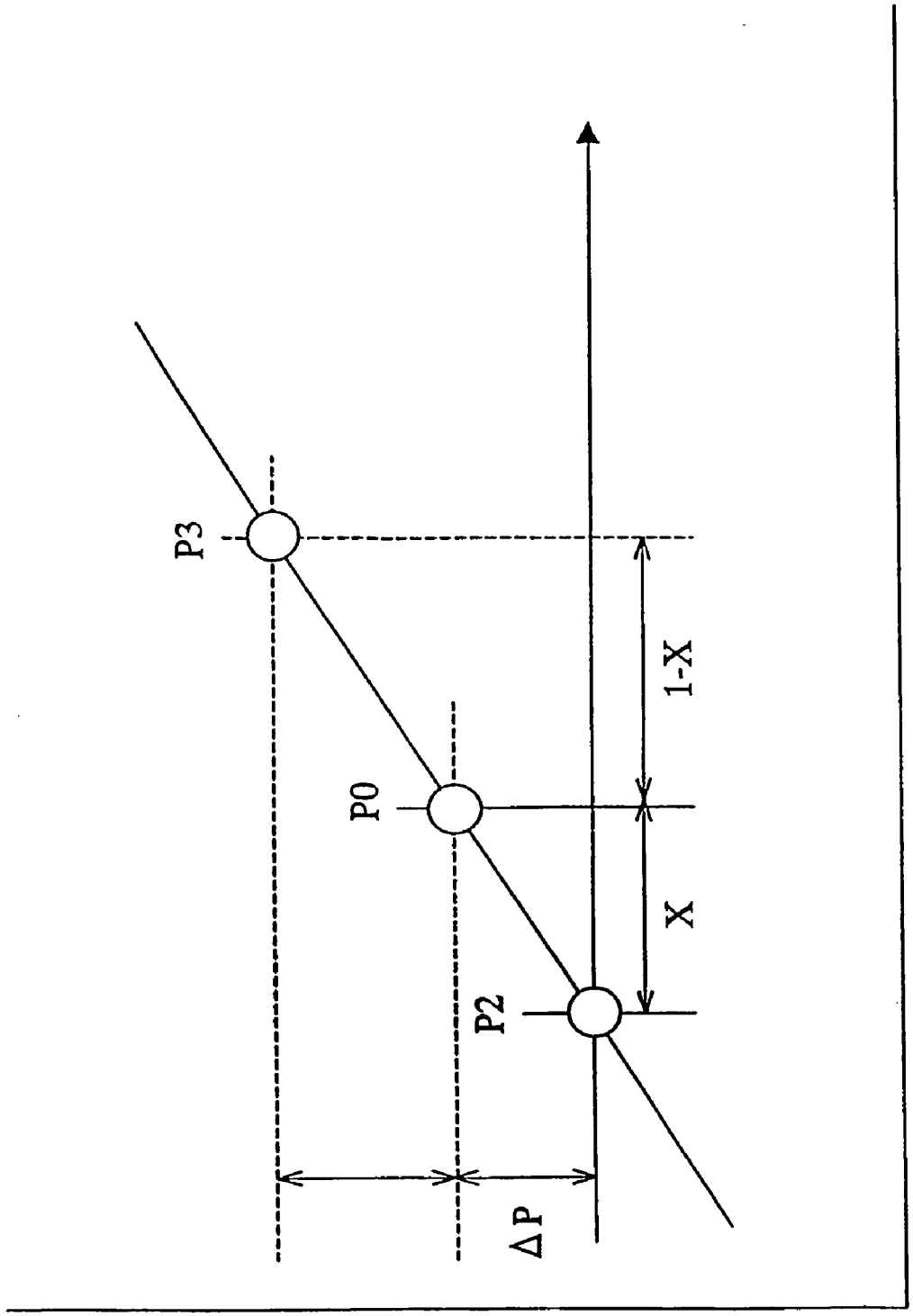
FIG. 7 is a diagram for explaining a second method for the interpolation processing.

The nearest neighbor method, the linear approximation method and the cubic convolution method will now be described while referring to FIGS. 6 to 8. As is shown in FIG. 6, the nearest neighbor method is a method whereby, when pixel P0 is to be generated between pixels P2 and P3 of image data consisting of pixels P1, P2, P3 and P4, the pixel value of the nearest pixel P2 is copied to the pixel value of the pixel P0 (see FIG. 6(b)). Therefore, the amount of operational processing is zero, and merely one line is sufficient for the processing line memory required for the interpolation process.

Figure 8:
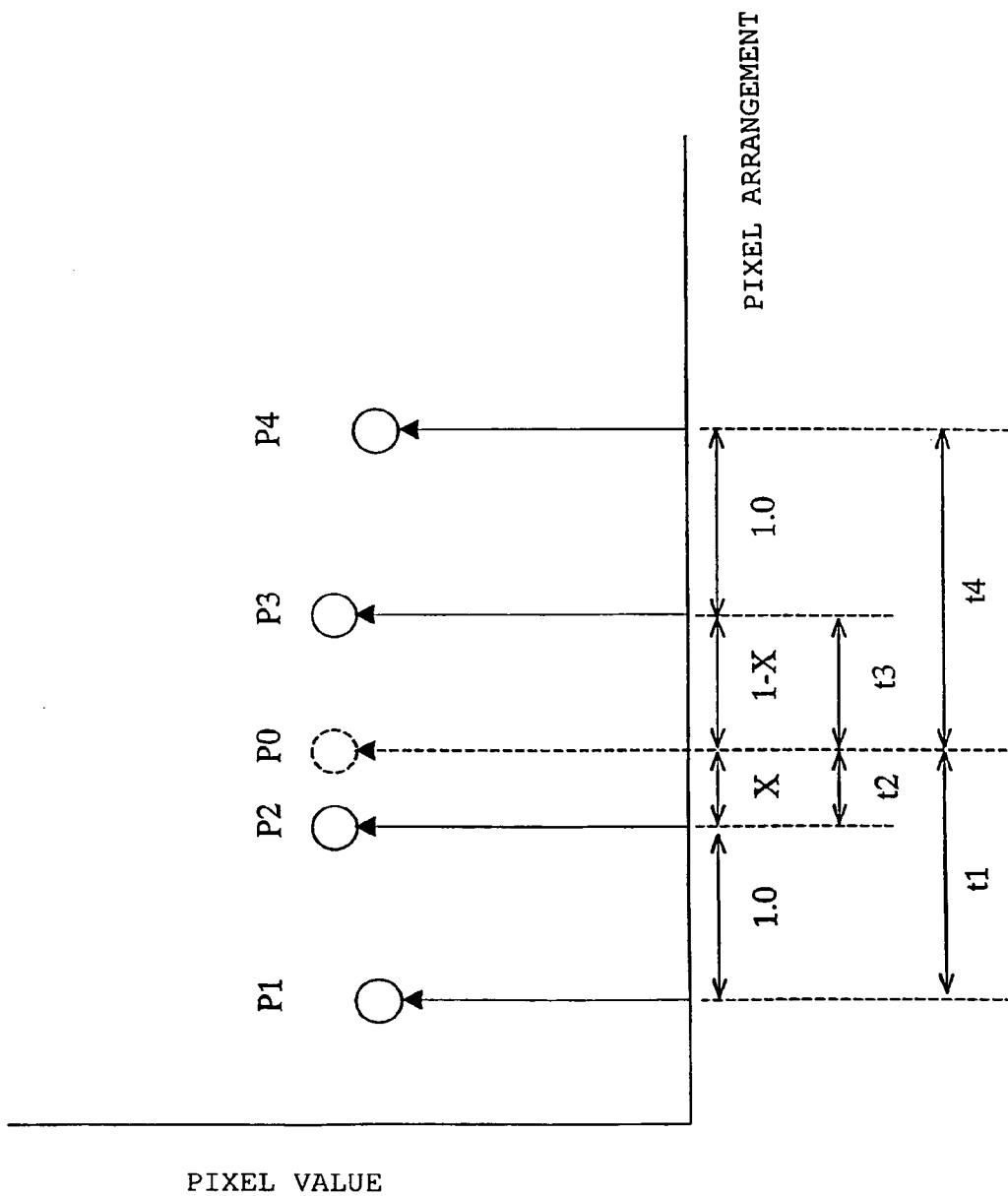
FIG. 8 is a diagram for explaining a third method for the interpolation processing.

On the other hand, as is shown in FIG. 8, the linear approximation method is a method performed while assuming that the pixel values are linearly changed, and whereby the pixel value of interpolation target P0 is calculated by proportionally distributing the pixel values of preceding and succeeding pixels P2 and P3 in accordance with the distance between the two. That is, when the pixel pitch is normalized and the distance to the preceding pixel P2 is defined as X, the pixel value of the pixel P0 is represented by weighted addition using the neighboring pixels P2 and P3, which is shown in a formula below. In this explanation, the process has been performed in a one-dimensional direction; however, in actuality, the process performed for the image is performed horizontally and vertically. Since the pixels corresponding to the two pixels P2 and P3 are required in both the horizontal direction and the vertical direction to obtain the pixel P0, a processing memory consisting of a minimum of two image lines is required. In the following formulas, the pixel values are denoted by symbols for corresponding pixels to make them easy to understand.

$$\Delta p = X(P3 - P2) \quad (1)$$

$$P0 = \Delta p + P2$$
$$= X(P3 - P2) + P2$$
$$= (1 - X)P2 + XP3$$

Whereas, according to the cubic convolution method, the changes in the pixel values are processed to obtain an approximate cubic curve. That is, as is shown in FIG. 7, according to the cubic convolution method, the pixel value of pixel P0 is represented by weighted addition using the four neighboring pixels P1 to P4, as is shown in the formula below. For this explanation, the process has been performed in a one-dimensional direction; however, in actuality, the process performed for an image is performed horizontally and vertically. Since pixels corresponding to the four pixels P1, P2, P3 and P4 are required both horizontally and vertically to obtain the pixel P0, a processing memory consisting of a minimum of four image lines is required.

$$P0 = k1 \cdot P1 + k2 \cdot P2 + k3 \cdot P3 + k4 \cdot P4 \quad (2)$$

In this formula, k1 to k4 denote weighted coefficients, and are obtained by the following interpolation function h(t). In this formula, t denotes a variable t1 to t4 that represents the positional relationship between each of the pixels P1 to P4 and the processing target pixel P0, and is represented by using the above described distance X.

$$h(t) = \begin{cases} (a+2)|t|^3 - (a+3)|t|^2 + 1 & 0 \le |t| < 1 \\ a|t|^3 - 5a|t|^2 + 8a|t| - 4a & 1 \le |t| < 2 \\ 0 & 2 \le |t| \end{cases} \quad (3)$$

wherein $t1 = 1.0 + X$
$t2 = +X$
$t3 = 1.0 - X$
$t4 = 2.0 - X$

Since the nearest neighbor method is a process merely for determining a distance from the preceding pixel to the succeeding pixel and for setting a pixel value, a drawback exists in that the image quality is degraded while the processing speed is extremely short.

On the other hand, according to formula (1), the linear approximation method requires two multiplications and one addition, so that compared with the nearest neighbor method, the amount of operational processing is increased, the processing speed is reduced, and a minimum two lines of processing line memory and a greater amount of memory are required. However, as a characteristic, the image quality is superior to that obtained using the nearest neighbor method.

Furthermore, the cubic convolution method requires four multiplications and three additions even for only the weighted addition, so that of these three methods, this method requires the largest number of operations, and accordingly, the processing speed is the lowest. However, as a characteristic, the highest image quality is provided.

Therefore, in the method selection process performed by the retrial module (S405 in FIG. 4), the optimal method need only be selected from among the above described methods, so that an image quality and a processing speed can be provided in consonance with the use state and the purpose of the use.

2. Second Mode

A second mode of the present invention will now be described while referring to the accompanying drawings.

Figure 9:
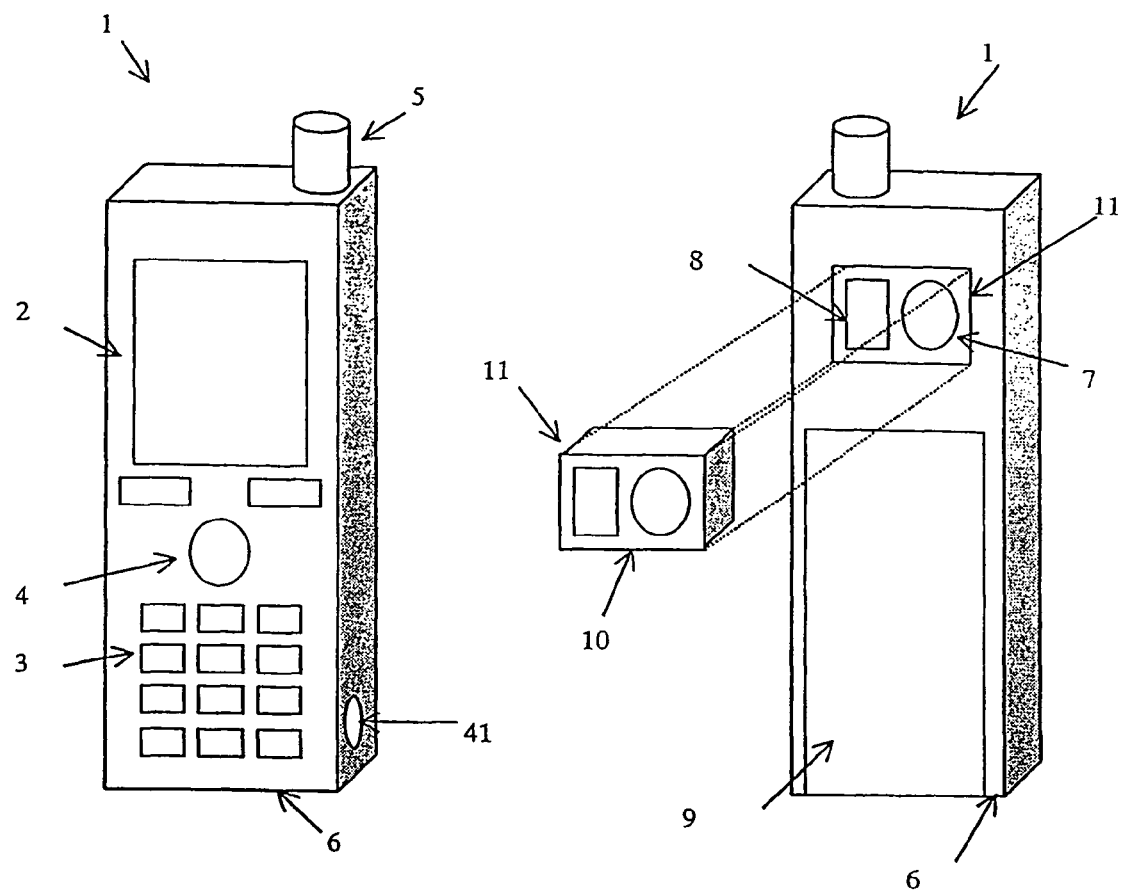
FIG. 9 is a diagram showing the external appearance of a cellular phone equipped with a camera.

FIG. 9 is a diagram showing the external appearance of a cellular phone equipped with a camera, for which the present invention is applied. A display panel 2, a ten-key pad 3, a function button 4, an antenna 5, etc., are provided on the obverse surface of a camera-equipped cellular phone 1; a camera unit 11, a battery cover 9, etc., are provided on the reverse surface; and a case 6, which holds all these components, is provided. Further, a data output terminal 41 is provided for the connection of an external printer. As is well known, a camera-equipped cellular phone 1 is small and light, so that no inconvenience is incurred when the cellular phone is carried in a handbag. The camera unit 11 includes a lens 7 and an LED luminaire 8, and is constituted as a camera module having an independent case 10. The camera unit is provided as an independent module because multiple uses for the camera module are available since the camera module can be easily assembled with another cellular phone or a PDA. Therefore, the camera-equipped cellular phone 1 of this mode can be separated into the camera module 11 and the remaining section (the host module).

The function button 4, for example, is used to send or receive a call, or is used as a shutter button for photographing. The function button 4 is also used as a button to start the reconstruction of image data. When a user employs the camera-equipped cellular phone 1 to make a call, the user holds the camera-equipped cellular phone 1 with the lens 7 aimed at a target, and confirms, on the display panel 2, a preview image obtained by the camera module 11. Then, imaging is performed by pressing the function button 4, and the obtained image data are stored in the storage device provided for the camera-equipped cellular phone 1.

Figure 10:
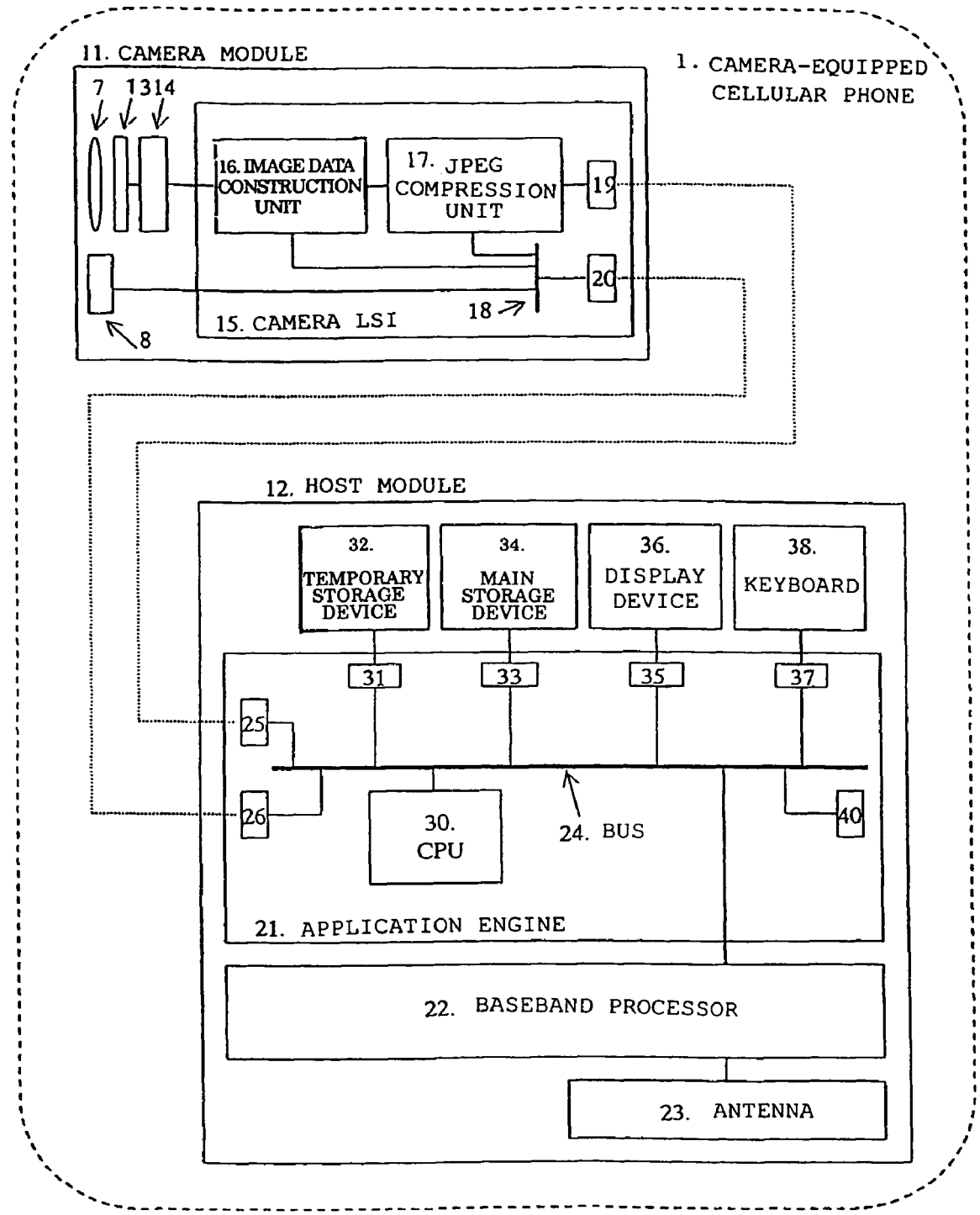
FIG. 10 is a diagram showing the hardware configuration of the cellular phone equipped with the camera.

While referring to FIG. 10, an explanation will be given for the hardware configuration and the operation of the camera-equipped cellular phone for which the present invention is applied. As is described above, the camera-equipped cellular phone 1 is constituted by the camera module 11 and a host module 12; the camera module 11 controls the imaging and the creation of image data, and the host module 12 controls the saving and the display of the created image data and PDA functions, such as a phone function and a scheduling function.

The camera module 11 includes the lens 7, the LED luminaire 8, a solid state imaging device 13, an A/D converter 14, an image data construction unit 16, a JPEG compression unit 17, a bus 18, a data interface 19 and a control interface 20. Of these components, the image data construction unit 16, the JPEG compression unit 17, the bus 18, the data interface 19 and the control interface 20 are provided as a camera LSI 15 that uses a single chip.

A CCD or a CMOS sensor, for example, can be employed as the solid state imaging device). The solid-state imaging device 13 performs imaging by converting, into an electrical signal, light that has passed through the lens 7. The signal output by the solid state imaging device 13 is converted into digital data by the A/D converter 14. The digital data are called Bayer-type data, and are not yet image data that can be displayed by a computer or that can be printed by a printer.

Image data are constructed by the image data construction unit 16. The image data construction unit 16 first performs the original image processing, such as lens density correction and white balance control, for the Bayer-type data. Then, the Bayer-type data for which the original image processing has been performed are separated into red elements (R), green elements (G) and blue elements (B), and the CFA (Color Filter Array) interpolation process is performed for these color elements to construct RGB image data consisting of three RGB planes.

The algorithm used for the CFA interpolation very much affects the quality of constructed image data. It is difficult for image data having a high quality to be obtained using an algorithm available for a camera LSI that limits size, cost and speed. The image data construction unit 16 performs the processing, such as edge enhancement or gamma correction, for the thus obtained image data.

Finally, the RGB form of the image data is changed to the YUV form. The image data constituting one frame are sequentially produced for each line or for every several lines, and in the end, the image data for the whole frame are constructed by employing signals that are output by the solid state imaging device 13 using single image photography. Each set of the thus produced image data is sequentially transmitted to the JPEG compression unit 17, which then performs JPEG compression for the image data and transmits the resultant data, through the data interface 19, to the host module 12.

Referring again to FIG. 10, the hardware configuration and the operation of the host module 12 will be described. The host module 12 includes a data interface 25, a control interface 26, a CPU 30, a bus 24, an interface 31 for a temporary storage device, a temporary storage device 32, an interface 33 for a main storage device, a main storage device 34, an interface 35 for a display device, a display device 36, an interface 37 for a keyboard, a keyboard 38, an interface 40 for a printer, a baseband controller 22, and an antenna 23.

Of these components, the CPU 30, the bus 24 and the interfaces 25, 26, 31, 33, 35, 37 and 40 are provided as an application engine 21 by using a single chip. The baseband controller 22 controls a function related to the sending or the reception of calls, and has a special CPU. The application engine 21 controls a function other than the call transmission or reception function, and also controls functions for the processing of image data received from the camera module 11, for controlling the keyboard 38, for playing games, for playing music, and for scheduling. The CPU 30 can provide, through the control interfaces 26 and 20 and the bus 18, not only control of the JPEG compression unit 17 of the camera module 11, but also control of the individual processes performed by the image data construction unit 16, the turning on or off of the LED luminaire 8, the changing of the data collection mode of the solid state imaging device, and parameter control for the A/D converter 14. The keyboard 38 includes a ten-key pad 3 and a function button 4.

The image data output by the camera module 11 are transmitted through the data interface 25 to the host module 12, and are temporarily stored in the temporary storage device 32. A typical temporary storage device 32 is an SDRAM. The CPU 30 thereafter reads image data from the temporary storage device 32, and stores the image data in the main storage device 34. The main storage device 34 includes a storage medium on which data can be continuously saved when the camera-equipped cellular phone 1 has been powered off, and can, for example, be a flash memory, a CF card or an SD card.

The camera-equipped cellular phone of the present invention can reconstruct image data by using the host module. The CPU 30 performs the reconstruction of image data upon the reception of an instruction from a user interface. The CPU 30 first processes the image data to restore the Bayer-type data, and then employs a high-level algorithm to construct new image data. The thus constructed high quality image data are then stored in the main storage device 34, or are transmitted to a printer through the printer interface 40.

Figure 11:
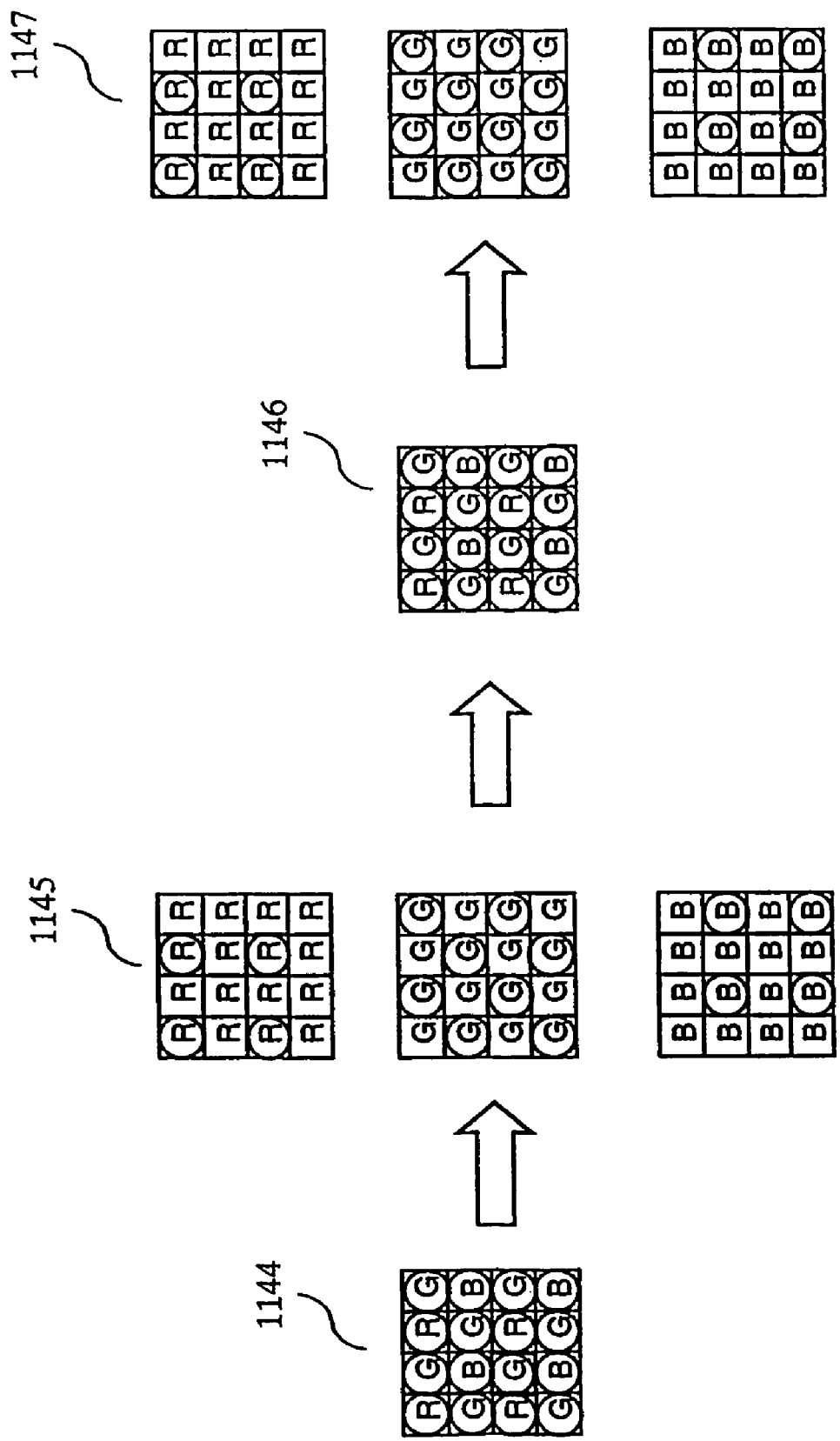
FIG. 11 is a diagram for explaining the creation and re-creation of image data.

The processing for the construction and reconstruction of image data will be described while referring to FIG. 11.

Data obtained merely by digitizing the output signal of the sensor, as is indicated by number 1144, is of Bayer type, wherein multiple unit matrixes, each of which is composed of one red pixel (R), two green pixels (G) and one glue pixel (B), are repeated. The elements of the individual colors are separated from the Bayer-type data, and an interpolation process is performed for these elements to construct RGB image data 45. Pixel data enclosed by circles, as denoted by number 1145, are either the same as the original Bayer-type data or are substantially unchanged. Therefore, the pixel data enclosed by circles, denoted by 1145, need only be extracted to reconstruct the original Bayer-type data.

Of course, in order to reconstruct the original Bayer-type data, which pixel data of the RGB image data are derived from the original Bayer-type data must be determined in advance. There are various methods available for this determination: a method for performing this determination at the interpolation stage; and a method for embedding information in the header of the constructed image data. When the high-level original image processing, the interpolation process and the post-process are performed for the reconstructed Bayer-type data, new image data 1147 are created.

It should be noted that when the Bayer-type data are reconstructed from the JPEG compressed RGB data, Bayer-type data that are completely the same as the original data can not be extracted. However, the advantage obtained when the image data are reconstructed by using a high-level algorithm is greater than the loss of some data.

Figure 12:
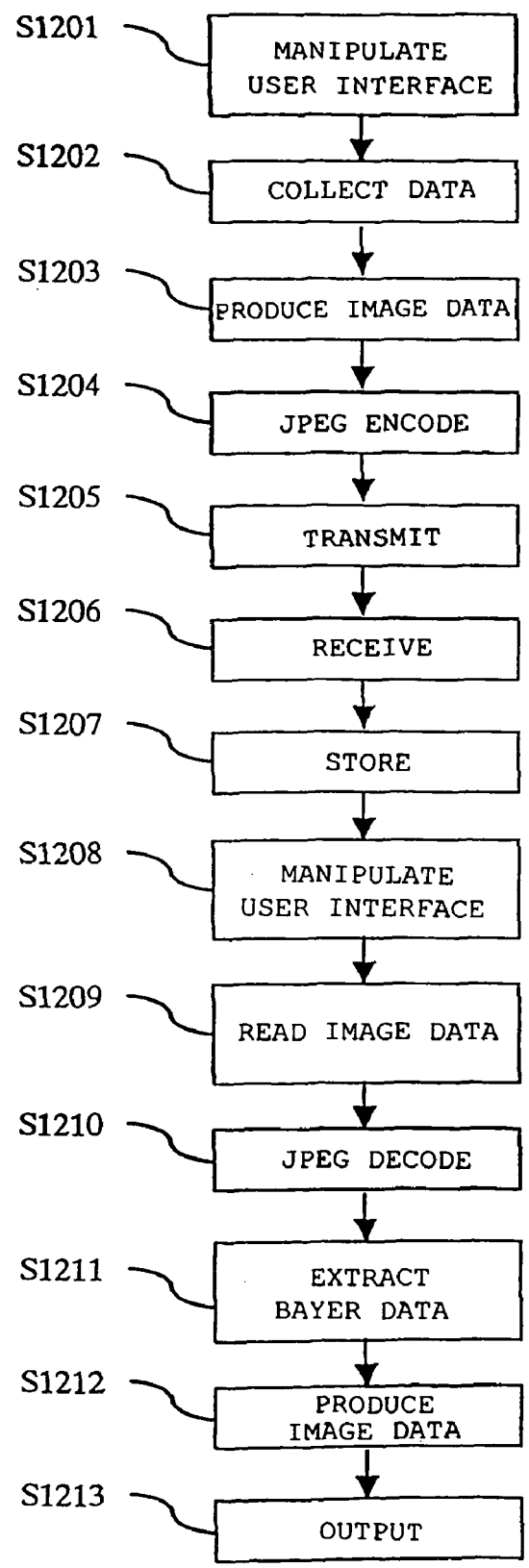
FIG. 12 is a flowchart for a photographing mode.

The processing performed by the camera-equipped cellular phone 1 of the present invention will be now described while referring to FIG. 12.

In the case of photography, first, the user interface is manipulated (S1201). Then, the image sensor of the camera module 11 converts light into an electrical signal (S1202), and image data are constructed based on the electrical signal (S1203). The thus constructed image data are compressed using the JPEG method (S1204), and the compressed data are transmitted to the host module 12 (S1205). The host module receives the image data (S1206), and stores the image data in the storage device (S1207).

In the case of the printing of obtained image data, first, the user interface is manipulated (S1208). Then, the host module 12 reads image data from the storage device (S1209), decompresses the image data that have been read (S1210), and extracts and reconstructs Bayer-type data based on the decompressed image data (S1211). Further, the host module 12 employs a new high-level algorithm to prepare new image data based on the thus reconstructed Bayer-type data (step S1212), and outputs the newly created image data to the printer (step S1213).

The modes of the present invention have been explained; however, the present invention is not limited to the above description. While the nearest neighbor method, the linear approximation method or the cubic convolution method has been employed in these modes as the interpolation method, an interpolation process using, for example, the spline function or the Bezier function can be employed instead of, or in addition to the above methods.

Furthermore, in the modes, the present invention has been applied for the image data processing. However, the present invention is not limited to this, and can be applied for a case wherein there is a change in the sampling pitch of various data, e.g., the sampling frequency of audio data.

INDUSTRIAL APPLICABILITY

As is described above, according to the present invention, an information terminal can be provided that can change, at a low cost and within a short period of time, image quality and processing speed in accordance with the use state and a variety of conditions.

Furthermore, according to the present invention, an information terminal can be provided that can reduce the affect produced by the simplified processing performed by the camera DSP, and that can improve the image quality of an image.

Further, according to the present invention, an information terminal can be provided that can produce an image having a higher image quality than other information terminals that employ cameras having the same functions.

In addition, according to the present invention, an information terminal can be provided that can improve the quality of an image without changing a camera module or increasing the functions required of the camera DSP.

The invention claimed is:

1. An apparatus comprising:
   at least one processor; and
   at least one memory including non-transitory computer readable program code, where the at least one memory and the computer program code are configured, with the at least one processor, to cause the apparatus to at least:
   perform at least one process for input image data resulting from a first interpolation process, including removing at least part of an effect of the first interpolation process from the input image data; and
   prepare output data by performing a second, different, interpolation process for the image data obtained after the at least part of the effect of the first interpolation has been removed.

2. The apparatus according to claim 1, comprising a camera module including a lens, an image sensor, and a camera digital signal processor, where the camera digital signal processor includes a color correction unit, a gamma correction unit, a color interpolation unit, and an image quality correction unit,
   where the input image data is produced by the camera module,
   where removing the at least part of the effect of the first interpolation process includes removing pixels that are interpolated by the color correction unit of the camera digital signal processor, and minimizing affects due to a color correction process and an image quality correction process performed by the camera digital signal processor, and where performing the second, different, interpolation process includes performing a color interpolation process that is different than the first interpolation process and further performing an image quality correction process.

3. The apparatus according to claim 2, where the apparatus is further caused to:

identify an arrangement pattern for color filters that are laid on the image sensor, separate color elements of pixels generated during the interpolation process by the color correction unit from color elements of pixels used to produce the color elements of pixels, and selectively perform a process for the color elements of the pixels generated during the interpolation process by the color correction unit.

4. The apparatus of claim 1 embodied in a mobile device.

5. A method, comprising:

obtaining image data, performing an interpolation processes for the image data thus obtained, and outputting the image data resulting from the interpolation processes, where performing the interpolation processes include:

performing at least one process including removing, with at least one processor, at least part of an effect of a first interpolation process from the image data resulting from the first interpolation process; and performing a second, different, interpolation process for image data obtained after the at least part of the effect of the first interpolation process has been removed.

6. The method of claim 5, wherein the at least one process includes a process performed on pixels that are interpolated by a color corrector so as to minimize affects due to a color correction process and an image quality correction process performed by a camera digital signal processor, and where the second, different, interpolation process includes a color interpolation process and an image quality correction process that is different than the first interpolation process.

7. The method of claim 6, where performing the at least one process further includes:

identifying an arrangement pattern for color filters that are laid on the image sensor, separating color elements of pixels generated during the first interpolation processes from color elements of pixels used to produce the color elements of pixels, and selectively processing color elements of pixels generated during the first interpolation process.

* * * * *